(12) United States Patent
Murphy (10) Patent No.: US 11,733,129 B2
(45) Date of Patent: Aug. 22, 2023

(54) TEST BARRIER FOR AIR DISTRIBUTION SYSTEM

(71) Applicant: Shawn Murphy, Punta Gorda, FL (US)

(72) Inventor: Shawn Murphy, Punta Gorda, FL (US)

( * ) Notice: Subject to any disclaimer, the term of this patent is extended or adjusted under 35 U.S.C. 154(b) by 0 days.

(21) Appl. No.: 17/349,812

(22) Filed: Jun. 16, 2021

(65) Prior Publication Data

US 2022/0404236 A1      Dec. 22, 2022

(51) Int. Cl.
*G01M 99/00* (2011.01)
*F24F 13/02* (2006.01)

(52) U.S. Cl.
CPC ....... *G01M 99/008* (2013.01); *F24F 13/0209* (2013.01)

(58) Field of Classification Search
CPC .......................... G01M 99/008; F24F 13/0209
USPC ............................................................ 73/37
See application file for complete search history.

(56) References Cited

U.S. PATENT DOCUMENTS

| | | | |
|---|---|---|---|
| 3,889,581 A * | 6/1975 | Bray, Sr. ................ | F24C 15/20 55/DIG. 36 |
| 4,964,438 A | 10/1990 | Welty | |
| 6,361,578 B1 | 3/2002 | Rubinson | |
| 9,557,073 B2 | 1/2017 | Breed et al. | |
| 10,309,684 B1 | 6/2019 | Taylor, Jr. | |
| 10,473,358 B2 | 11/2019 | Breed | |
| 10,976,070 B1 * | 4/2021 | Albers ................ | F24F 13/0263 |
| 2006/0116067 A1 | 6/2006 | Federspiel | |
| 2010/0233953 A1 | 9/2010 | Mavroudis et al. | |
| 2012/0018014 A1 | 1/2012 | Fernandes et al. | |
| 2017/0273214 A1 * | 9/2017 | Casparian ............. | G06F 1/1632 |

FOREIGN PATENT DOCUMENTS

| | | |
|---|---|---|
| WO | 2011127162 A1 | 10/2011 |
| WO | 2013072238 A1 | 5/2013 |

\* cited by examiner

*Primary Examiner* — Lee E Rodak
*Assistant Examiner* — Byung Ro Lee
(74) *Attorney, Agent, or Firm* — Lambert Shorten & Connaughton; David J. Connaughton, Jr.; Justin P. Tinger (57) ABSTRACT

A test barrier, a system incorporating the test barrier, and a method for using the same is disclosed herein. The test barrier is intended for use in testing that may be conducted on sections of an air distribution, HVAC, and other similar systems. The test barrier is comprised of a temporary test barrier portion and a gasket connection portion. The test barrier may be advantageously connected to a rip cord that enables easy removal of the test barrier upon completion of any testing.

20 Claims, 7 Drawing Sheets

TEST BARRIER FOR AIR DISTRIBUTION SYSTEM

BACKGROUND

Technical Field

The present disclosure relates generally a test barrier for an air distribution system. More particularly, the present disclosure relates to a test barrier comprising a temporary test barrier portion and a gasket connection portion that may be combined with a rip cord for easy removal upon completion of any test requiring separation between at least two ducts.

Description of Related Art

Due to developments in the field relating to the efficiency and design performance of heating ventilation and air conditioning ("HVAC") and other air distribution systems, a much clearer understanding of the air flow characteristics inside duct systems has emerged.

Unfortunately, the process of conducting tests regarding the air flow, the pressure, and other variables within such duct systems is plagued by constant problems and inefficiencies that have a countless number of potential solutions. The devices and processes that are commonly used for separating tests in one duct section from another often yield inconsistent results due to human error and other variables.

Therefore, what is needed is a test barrier and a method or system of utilizing the same having the following characteristics and benefits over the prior art.

SUMMARY

The subject matter of this application may involve, in some cases, interrelated products, alternative solutions to a particular problem, and/or a plurality of different uses of a single system or article.

It is an object of the present disclosure to provide a test barrier and a method or system of utilizing the same in any test within a duct system that may require separation between individual duct sections. It is another object of the present disclosure to provide a test barrier that is installed at predetermined locations prior to the assembly of duct sections designed to complete an air distribution system in order to provide a mechanism for separating pressure or air flow tests within individual sections of the entire system.

In one aspect of the present disclosure, a test barrier is utilized, which comprises a temporary test barrier portion, a gasket connection portion, and at least one attachment location for attaching a rip cord.

In another aspect of the present disclosure, a method of using the test barrier is disclosed. This method includes the steps of attaching the test barrier to a test gasket, and attaching the test gasket to a test duct section having an interior and an exterior.

In yet another aspect of the present disclosure, a system incorporating a test barrier is disclosed. This system comprises a test duct section forming duct connections on opposite ends of the test duct section, wherein the duct connections comprise a test barrier attached to a rip cord separating the test duct sections from non-test duct sections.

It should be understood that the various elements of the present disclosure utilized in different aspects may be of varying sizes and shapes or utilized in a different order without straying from the scope of the present disclosure.

DETAILED DESCRIPTION

The detailed description set forth below in connection with the appended drawings is intended as a description of presently preferred embodiments of the invention and does not represent the only forms in which the present disclosure may be constructed and/or utilized. The description sets forth the functions and the sequence of steps for constructing and operating the invention in connection with the illustrated embodiments.

Generally, the present disclosure concerns a test barrier for separating a test duct section from non-test duct sections in an air distribution system. More specifically, the present disclosure concerns a test barrier having a temporary test barrier and a gasket connection portion that may be combined with a rip cord for advantageous removal from the duct system upon completion of any test requiring the separation of duct sections.

The test barrier disclosed may be made of a polymer or plastic material, a fabric-like material, or other material.

In most embodiments, the test barrier comprises two sections, a temporary test barrier portion, and a gasket connection portion. Similarly, in most embodiments, the gasket connection portion has a wider perimeter than the temporary test barrier portion such that the temporary test barrier is contained within the interior perimeter of the gasket connection portion. The test barrier and the separate segments comprising the test barrier may be substantially the same shape and size as the duct sections it is separating. For example, if the duct sections that the test barrier is separating are square or rectangular shaped, the test barrier may be square or rectangular shaped. Similarly, if the duct sections are circular or oval shaped, the test barrier may be circular or oval shaped. However, in some embodiments, the test barrier may be a different shape than the duct sections it is separating. In some embodiments, the cross-sectional area of the test barrier is similar to the cross-sectional area of the duct sections.

In some embodiments, the temporary test barrier portion and the gasket connection portion of the test barrier are completely integrated with each other such that there is no difference between one or the other. In other embodiments, these two separate sections may be weakly connected to each other along the perimeter of the temporary test barrier portion and the interior perimeter of the gasket connection portion. In almost all embodiments, there are no openings or apertures that allow air or pressure to flow from one side of the test barrier to the other. In this way, the test barrier facilitates the separation between test duct sections and non-test duct sections, regardless of how the temporary test barrier and gasket connection portions are connected. The test duct section and non-test duct sections may have a plurality of interior faces and a plurality of exterior faces.

In most embodiments, the temporary barrier portion of the test barrier comprises at least one attachment location for connection of the rip cord to the test barrier. In embodiments utilizing one attachment location, the attachment location may be located in the center of the temporary test barrier; however, the attachment location may be located anywhere on the temporary test barrier. Similarly, in embodiments that utilize a plurality of attachment locations, the attachment locations may be located anywhere on the temporary test barrier. For example, in some embodiments that utilize four attachment locations and a substantially square test barrier, each attachment location is located at or near the corners of the temporary barrier.

In some embodiments, the test barrier comprises an embedded rip cord. The embedded rip cord may or may not be made from the same material as the separate rip cord that may be attached to the test barrier for the barrier's eventual removal from a duct connection. The embedded rip cord may be contained within the temporary test barrier portion of the test barrier. Alternatively, the embedded rip cord may be contained within the test barrier and located at or near the perimeter where the temporary test barrier portion of the test barrier connects with the gasket connection portion of the test barrier. In some embodiments, the attachment locations are reinforced by the embedded rip cord, and the rip cord may comprise separate portions of material connected to individual attachment locations. In some embodiments, the attachment locations may comprise rings, such as D-ring, made of metal or other material, wherein an end of the rip cord can be hooked, clipped, tied, or otherwise connected. In other embodiments, the attachment locations may comprise circular grommets made of metal or other material. In these embodiments, the embedded rip cord may comprise one continuous strand of material connected to, through, or under each attachment location. In these embodiments, the embedded rip cord within the test barrier is accessible at each attachment location such that an end of the rip cord may be connected directly to the embedded rip cord instead of to the attachment location.

A method of using the test barrier to separate duct sections for the purpose of conducting pressure tests or any other type of test that may require separation between individual duct sections is also disclosed herein. In some embodiments, the method may include the step of predetermining locations where the test barrier should be installed prior to the combination of individual duct sections. In other embodiments, the method may include the steps of disassembling individual duct sections, installing the test barrier, and reassembling the duct sections. In some embodiments, the steps conducted may be performed at the connections located at both ends of the section of duct work which may be tested (also referred to as the test duct section). The duct sections that are connected to either end of a test duct section (also referred to as the non-test duct sections) may also be tested.

In some embodiments, the method may comprise the step of cleaning connections on both the test duct sections and non-test duct sections to ensure proper attachment or adhesion of a gasket material. In some embodiments, the connections on either the test duct section, the non-test duct section, or both may comprise flange connections or any other type of connection that is compatible with ductwork. In some embodiments, the method may include the step of applying gasket material to the connections of both the test duct section and the non-test duct sections. In other embodiments, the gasket material may also be applied to both sides of the connections on either the test duct section, the non-test duct section, or both. The gasket that is applied to the connections on the non-test duct sections may be referred to as the non-test gasket. Similarly, the gasket that is applied to the connection or connections on the test duct section may be referred to as the test gasket. Both the non-test gasket and the test gasket may comprise an adhesive gasket tape or other gasket material. Other types of gasket material which may be used in the method or process may not be adhesive.

In some embodiments, a face of the test barrier may be attached, connected, or adhered to either the non-test gasket or the test gasket. The opposite face of the test barrier may be attached, connected, or adhered to the other of the non-test gasket or the test gasket. In most embodiments of the method, the test barrier may be inspected for any tears or holes before being installed. In some embodiments, the test barrier may be attached, connected, or adhered to either the non-test gasket or the test gasket at the gasket connection portion of the test barrier. The connection or adhesion between a non-test duct section, a non-test gasket, the test barrier, a test gasket, and a test duct section may form a duct connection. In some embodiments, the test barrier may comprise position indicators on at least one face of the test barrier to ensure that the test barrier is properly lined up before forming a duct connection. For example, if the test barrier comprises a substantially square shape, the test barrier may comprise 90-degree position indicators which may help a user position the test barrier correctly with the four corners of the substantially square portion of a duct section. Additionally, if the test barrier comprises a substantially circular shape, the test barrier may comprise a diameter position indicator which may help a user position the test barrier correctly with the circumference of a substantially circular duct section. In some embodiments, upon completion of a duct connection, duct sealer may be applied to areas of the duct connection or connections, such as flange connections, on either the non-test duct sections or the test duct sections, where gaps or openings may be located or observed. In some embodiments, wherein the test barrier comprises a position indicator, the position indicator may be visible from the exterior of the ductwork upon completion of the duct connection. In most embodiments of the method, caution may be taken during the formation of a duct connection not to damage the test barrier, and the duct connection may be completed using methods known in the art, including, but not limited to the utilization of bolts, clips, slips, drives, screws, duct sealers, etc., alternatively or in any combination.

In most embodiments, a rip cord may be attached to the test barrier before completion of a duct connection. The rip cord may be attached to a reinforced attachment location on the temporary test barrier portion of the test barrier. In some embodiments, the rip cord may be attached to the embedded rip cord within the temporary portion of the test barrier. In most embodiments, a rip cord removal location is utilized for eventual removal of the rip cord and the temporary portion of the test barrier, which may be accomplished by pulling on the rip cord. In some embodiments, a rip cord removal location may be determined before completion of a duct connection. In other embodiments, the rip cord removal location may be determined after the completion of a duct connection. Once the location for removal of the rip cord is determined, the removal location may be created, which may comprise a removal hole or other structure capable of being properly sized to allow the rip cord and temporary test barrier portion to egress from the duct section. Depending on the orientation of the test barrier within the duct connection, the removal location may be created in the test duct section or the non-test duct section. For example, if the face of the test barrier comprising an attachment location for the rip cord is located within the interior of the test duct section, the removal location may be created in the test duct section. Alternatively or simultaneously, in embodiments where both faces of the test barrier comprise at least one attachment location, a removal location may be created in each of the test duct section or the non-test duct sections.

In some embodiments, the removal location may be created before a duct connection is completed. In other embodiments, the removal location may be created after a duct connection is completed. Furthermore, in some embodiments, a face of the rip cord fastener may be connected or adhered to either an interior or an exterior face of a test duct section or non-test duct section in close proximity to the removal location. In some embodiments, the rip cord fastener may be located at least half an inch from the removal location. In other embodiments, the rip cord fastener may be located no more than three inches from the removal location. In most embodiments, an end of the rip cord may be attached to the rip cord fastener before testing begins. The rip cord fastener may comprise any material or structure capable of securing the rip cord while a test is being conducted. In some embodiments, the rip cord fastener comprises Velcro® material on the face of the fastener which is not connected or adhered to a duct section. However, in other embodiments, the rip cord fastener may be a hook, a loop of nylon material, the same material as the rip cord, or other similar material, wherein the rip cord may be tied, hung, or otherwise secured to the fastener. In some embodiments, an access panel may be installed on the interior of at least one of the duct sections, wherein an end of the rip cord may be stored during testing.

In some embodiments, a snap cap may be attached to either the exterior or the interior of the duct section in order to cover the removal location. In some embodiments, the snap cap may comprise a metal material, the same material as the ductwork, or any other material capable of sealing the removal location to prevent air or pressure from escaping from the duct section. In other embodiments, a grommet, which may comprise a rubber or other similar material, may be used to seal the removal location. In some embodiments, an end or a second portion of the rip cord may extend through the snap cap or the grommet, wherein the end or the second portion of the rip cord may be attached to a rip cord fastener attached to the exterior of either the test duct section or non-test duct section. In the embodiments where an end of the rip cord extends through either the snap cap or the grommet, the snap cap or the grommet may be structured to not allow air or pressure to escape from the duct section. In some embodiments, an access panel may be installed on an exterior face of at least one of the duct sections, wherein an end of the rip cord may be stored during testing.

In some embodiments, when the duct connections are formed and the rip cord is secured to the fastener or stored within an access panel, a test may be conducted. In some embodiments, a sign may be adhered or otherwise attached to at least one face of at least one duct section before or after a test is initiated. The sign may or may not comprise high visibility material and a status indicator. The status indicator may comprise wording such as "Barrier in Place," or "Test Pending," or other wording that may inform observers that a test is about to be or is currently being conducted.

In most embodiments, upon completion of the test, the temporary test barrier may be removed for the ductwork by pulling on the rip cord attached to the temporary test barrier portion. In some embodiments, the rip cord may be pulled on after being removed from an access panel. In other embodiments, the rip cord may be pulled on after being detached from the fastener. Once the rip cord is pulled on, the force from the pull may allow both the rip cord and the temporary test barrier to be pulled through the removal location, due to the temporary test barrier portion being separated from the gasket connection portion of the test barrier. In some embodiments, upon completion of the removal of both the rip cord and the temporary test barrier and separation of the temporary test barrier from the gasket connection, the gasket connection may or may not be removed from the exterior of the ductwork. In some embodiments, upon completion of the test and removal of the rip cord and test barrier, the removal location may be resealed with a permanent snap cap, wherein duct sealer may be used to prevent air flow or pressure from escaping the ductwork. Additionally, in some embodiments, the sign or signs may be removed from the ductwork, and at least one new sign comprising a different status indicator may be attached to at least one duct section. The status indicator may comprise the wording, "Test Complete," "Barrier Removed," or any other wording necessary to inform observers that any testing performed on the ducts was completed.

In some embodiments, the test barrier may comprises two separate pieces of material, wherein piece of material may comprise two faces. One face of each material may comprise an adhesive layer, and the opposite faces may comprise at least one attachment location for attaching an end of a rip cord. The adhesive faces of each piece of material may be adhered together, which may form a back-to-back adhesive test barrier.

A system incorporating a test barrier is also disclosed herein. This system may comprise a test duct section forming duct connections on opposite ends of the test duct section, wherein the duct connections may comprise a rip cord attached to a test barrier separating the test duct sections from non-test duct sections. The system may additionally comprise any of the elements which might have been incorporated into the aforementioned method of utilizing the test barrier.

Figure 1:
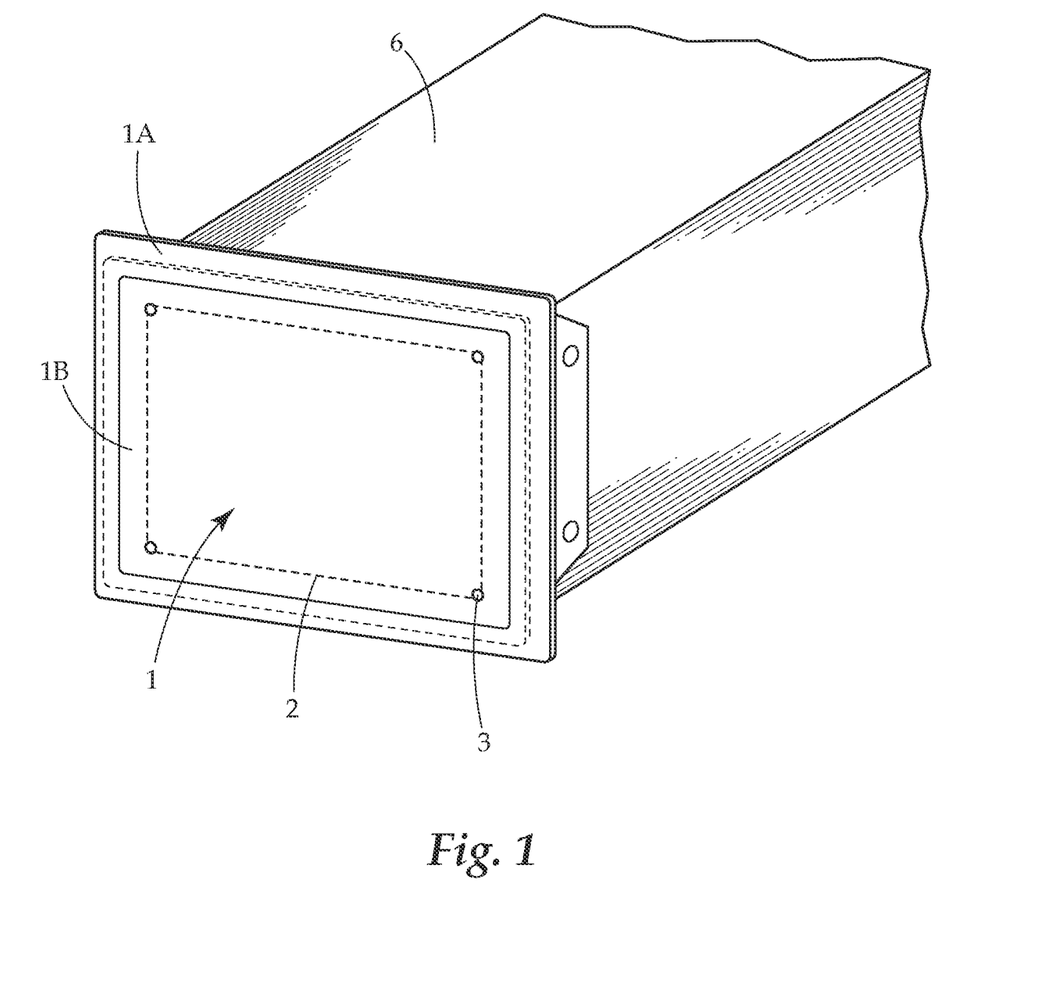
FIG. 1 provides a perspective view of an embodiment of the present disclosure.
Figure 2:
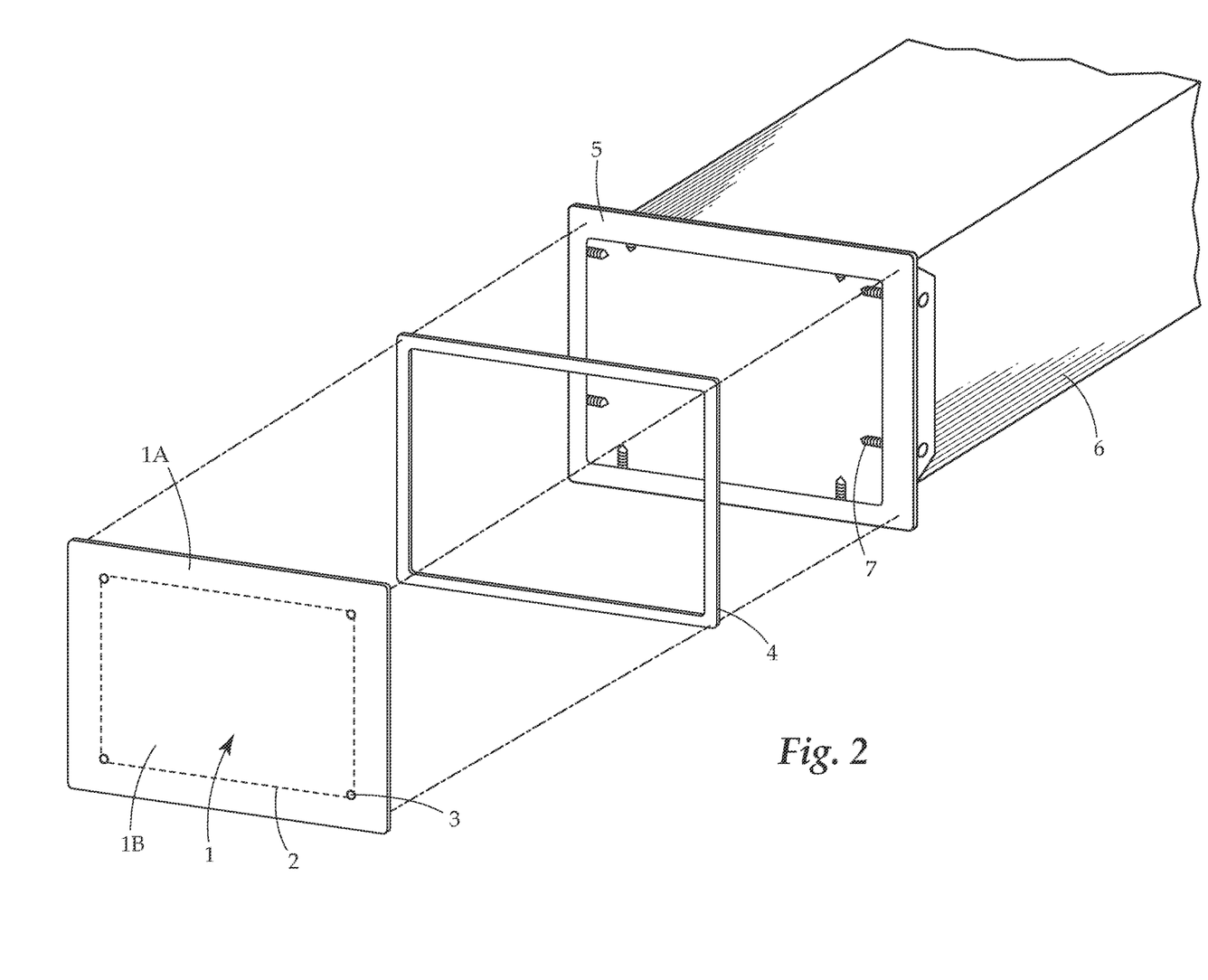
FIG. 2 provides a perspective view of a partially exploded embodiment of the present disclosure.

Turning now to the embodiments shown in FIGS. 1 and 2, which both show a test barrier 1 comprising a temporary test barrier 1B portion contiguous with and connected to a gasket connection 1A portion. The temporary test barrier 1B portion of the test barrier 1 further comprises an embedded rip cord 2 and a plurality of reinforced attachment locations 3 for rip cord 20 to be attached (shown in FIG. 4). The test barrier 1 is connected or adhered to a non-test gasket 4 by connecting or adhering the gasket connection 1A portion of the test barrier 1 to the non-test gasket 4. The non-test gasket 4 is also connected or adhered to a flange connection 5 of the non-test duct section 6. Furthermore, FIG. 2 shows a partially exploded view of an embodiment of a potential connection between the test barrier 1, the non-test gasket 4, and the non-test duct section 6. In this embodiment, the flange connection 5, comprises a plurality of screws 7.

Figure 3:
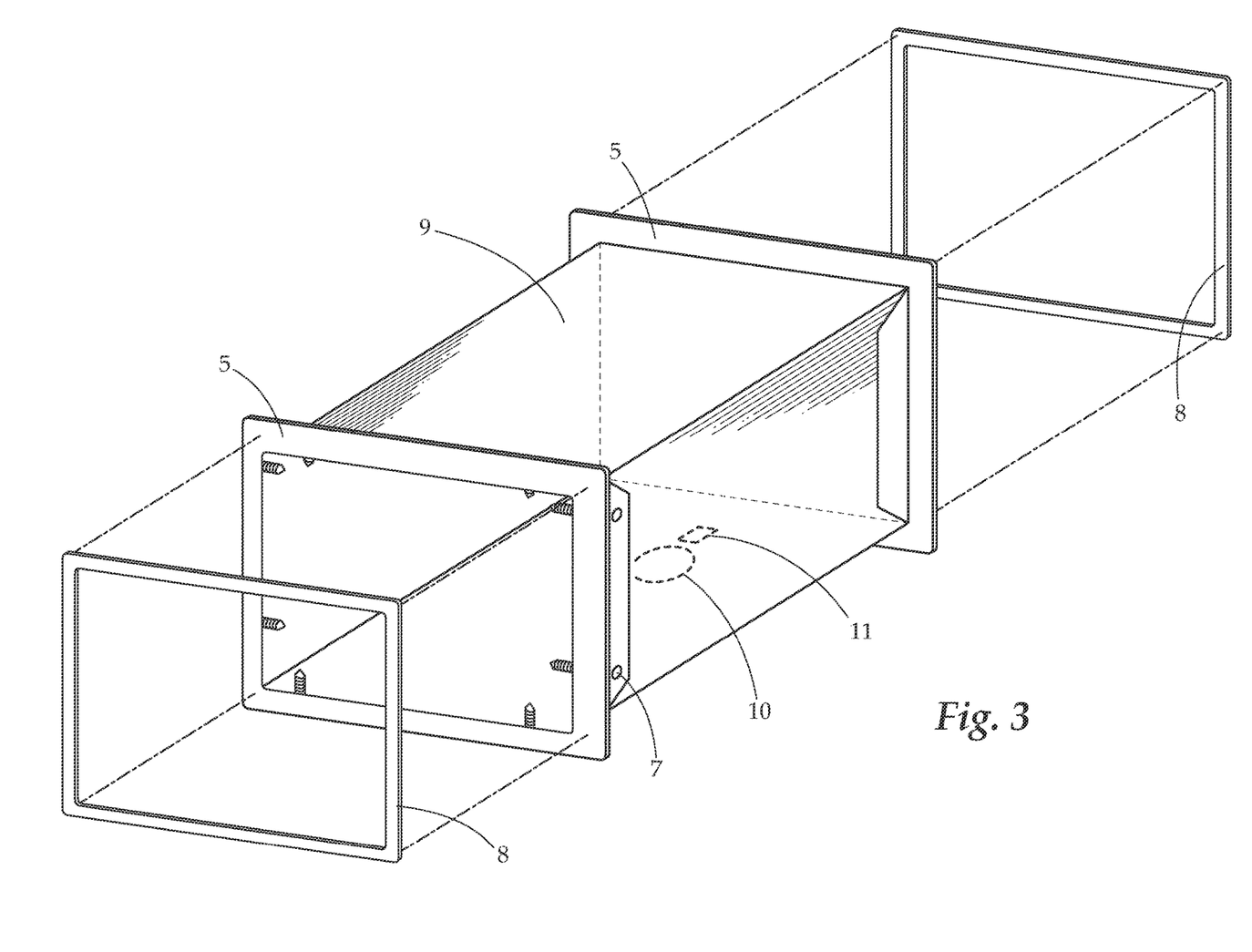
FIG. 3 provides a perspective view of another partially exploded embodiment of the present disclosure.

FIG. 3 shows a partially exploded view of an embodiment of a connection between two test gaskets 8 and a test duct section 9. In the embodiment shown, the test duct section 9 is assembled using a similar method of assembly to that of the non-test duct section 6, wherein the assembly of the test duct section 9 also utilizes flange connections 5 and a plurality of screws 7. The test duct section 9 further comprises a removal hole 10 for the eventual removal of rip cord 20 (shown in FIG. 4) and temporary test barrier 1B portion (shown in FIG. 4). In the embodiment shown in FIG. 3, a rip cord fastener 11 is attached on the interior of the test duct section 9; however, in other embodiments, the rip cord fastener 11 is attached to an exterior face of the test duct section 9 (shown in FIG. 7).

Figure 4:
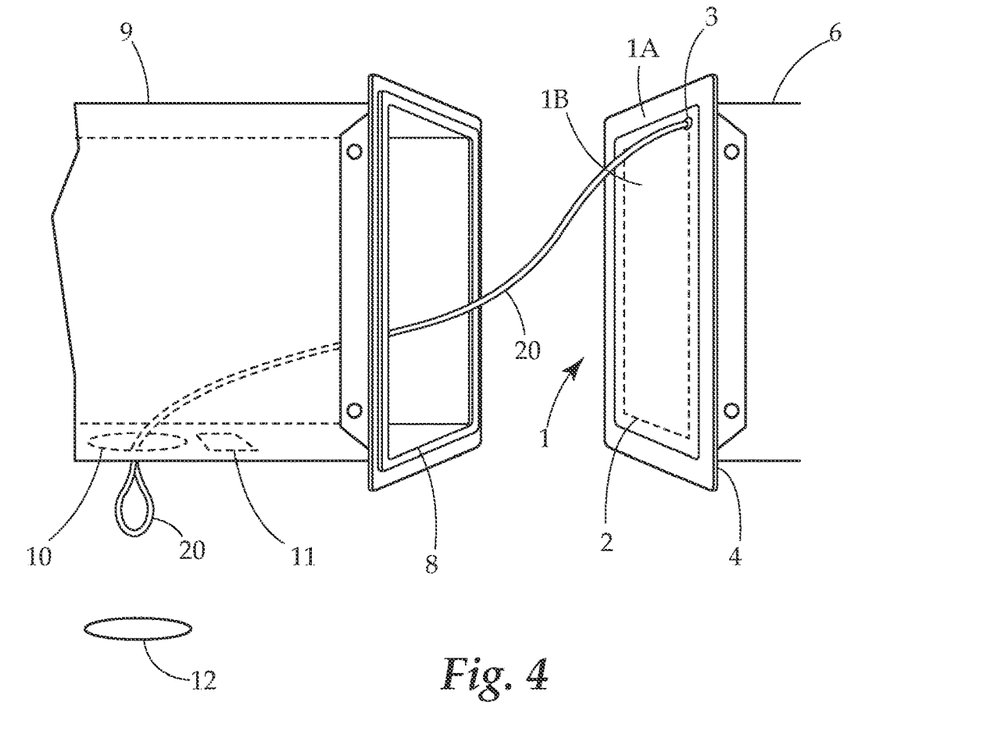
FIG. 4 provides a perspective view of another embodiment of the present disclosure.

FIG. 4 shows an embodiment of the present disclosure before a duct connection 13 (shown in FIG. 5) between at least one non-test duct section 6 and the test duct section 9 is formed. In this embodiment, an end of a non-test duct section 6 is connected or adhered to a non-test gasket 4, which is connected or adhered to a face of the gasket connection 1A of the test barrier 1, wherein another face of the gasket connection 1A of the test barrier 1 is connected or adhered to a test gasket 8, which is connected or adhered to an end of a test duct section 9. The connection or adhesion of the immediately preceding elements forms duct connection 13 (shown in FIG. 5). FIG. 4 also shows the rip cord 20 attached to a reinforced attachment location 3 on the temporary test barrier 1B portion of the test barrier 1. The attachment location 3 is reinforced by the embedded rip cord 2. In the embodiment shown, the test duct section 9 comprises a removal hole 10, wherein the rip cord 20 can extend through the test duct section 9 and through the hole 10. Similarly, the rip cord fastener 11 is connected or adhered to the interior of the test duct section 9. In some embodiments, like the one shown in FIG. 4, when a test is being conducted, the rip cord 20 is attached to the rip cord fastener 11, and a snap cap 12 covers the hole 10 to prevent air from escaping the test duct section 9.

Figure 5:
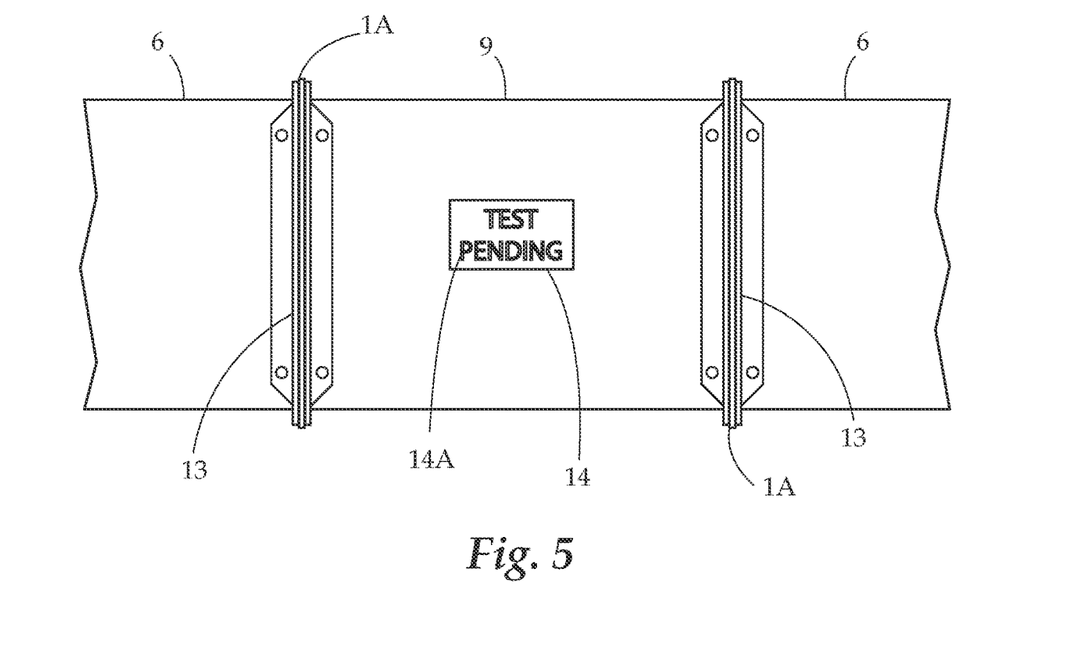
FIG. 5 provides a perspective view of another embodiment of the present disclosure.

FIG. 5 shows two completed duct connections 13 between opposite ends of a test duct section 9 and two non-test duct sections 6. In the embodiment shown, when a duct connection 13 is completed, the gasket connection 1A portion of the test barrier 1 protrudes or is accessible from the outside of the ducts 6 and 9. In the embodiment shown, during testing, a sign 14 is connected or adhered to the outside of the test duct section 9. The sign comprises a status indicator 14A, which contains wording meant to inform observers that a test is being conducted.

Figure 6:
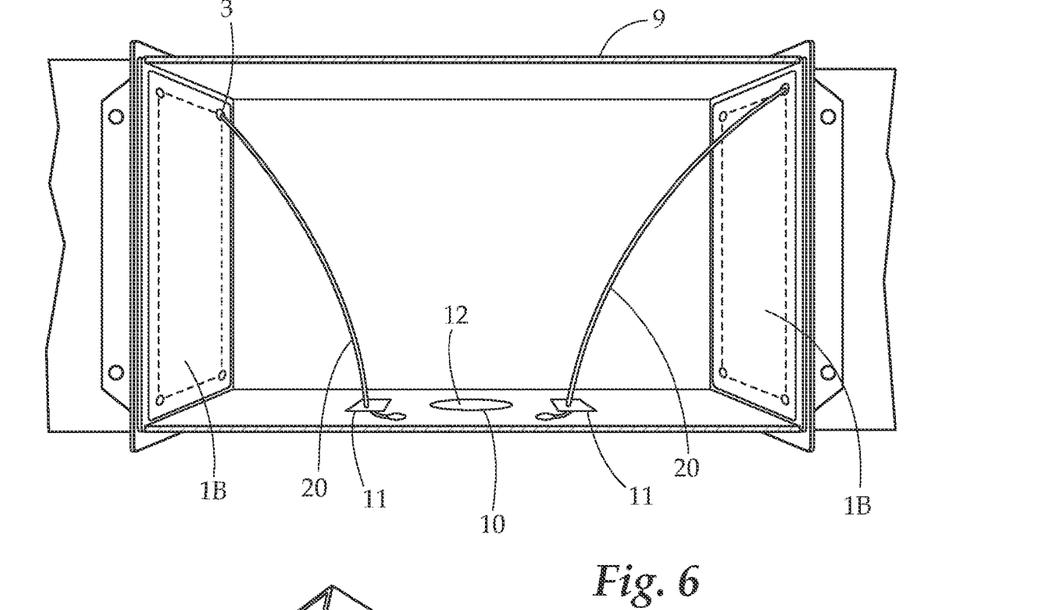
FIG. 6 provides a perspective view of another embodiment of the present disclosure.

FIG. 6 shows an inside view of an embodiment of a test duct section 9 around the time that a test is being conducted. In the embodiment shown, two temporary test barriers 1B separate the air or pressure within the test duct section 9 from other ducts. A first portion of the rip cord 20 is attached to the reinforced attachment location 3 of the temporary test barrier 1B, a second portion of the rip cord 20 is attached to the rip cord fastener 11, which is attached to the interior of the test duct section 9. In this embodiment, the removal hole 10 is covered or otherwise sealed by snap cap 12.

Figure 7:
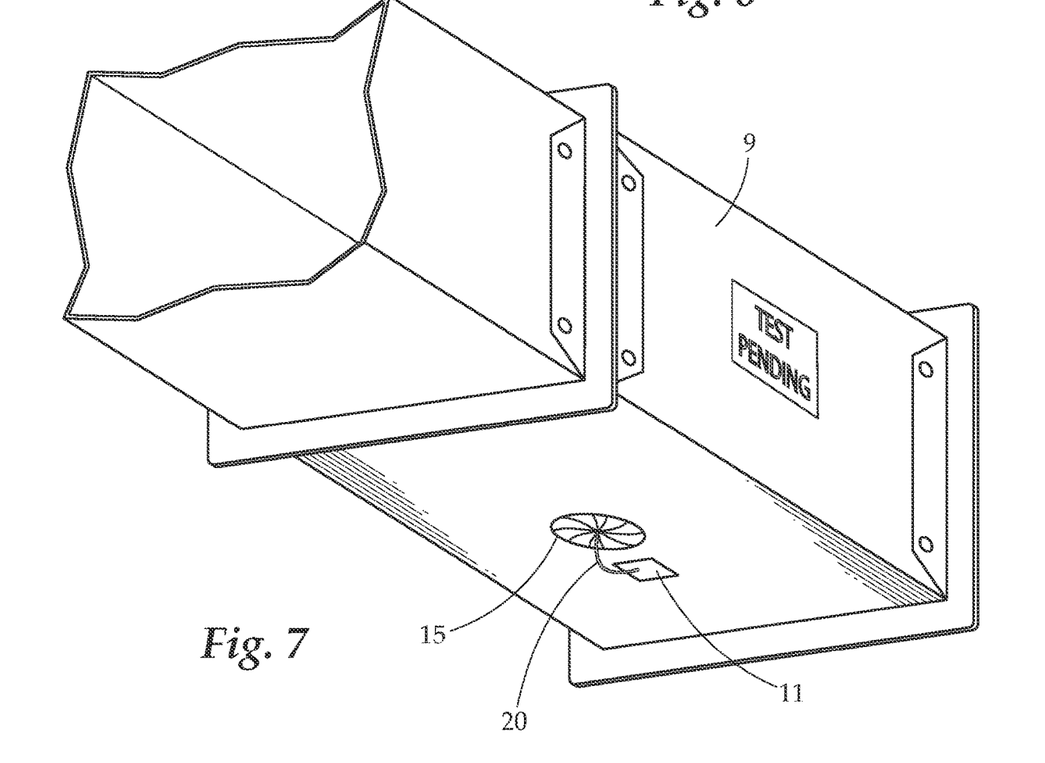
FIG. 7 provides a perspective view of another embodiment of the present disclosure.

In the embodiment shown in FIG. 7, the removal hole 10 (shown in FIG. 8) is covered or otherwise sealed by a grommet 15 around the time that a test is being conducted in test duct section 9. In the embodiment shown, the grommet 15 is structured in such a way as to allow a portion of the rip cord 20 to protrude or extend outside of the test duct section 9 without allowing air or pressure to escape as well. The protruding end of the rip cord 20 is connected or attached to a rip cord fastener 11, which is connected, adhered, or otherwise attached to the outside of the test duct section 9.

Figure 8:
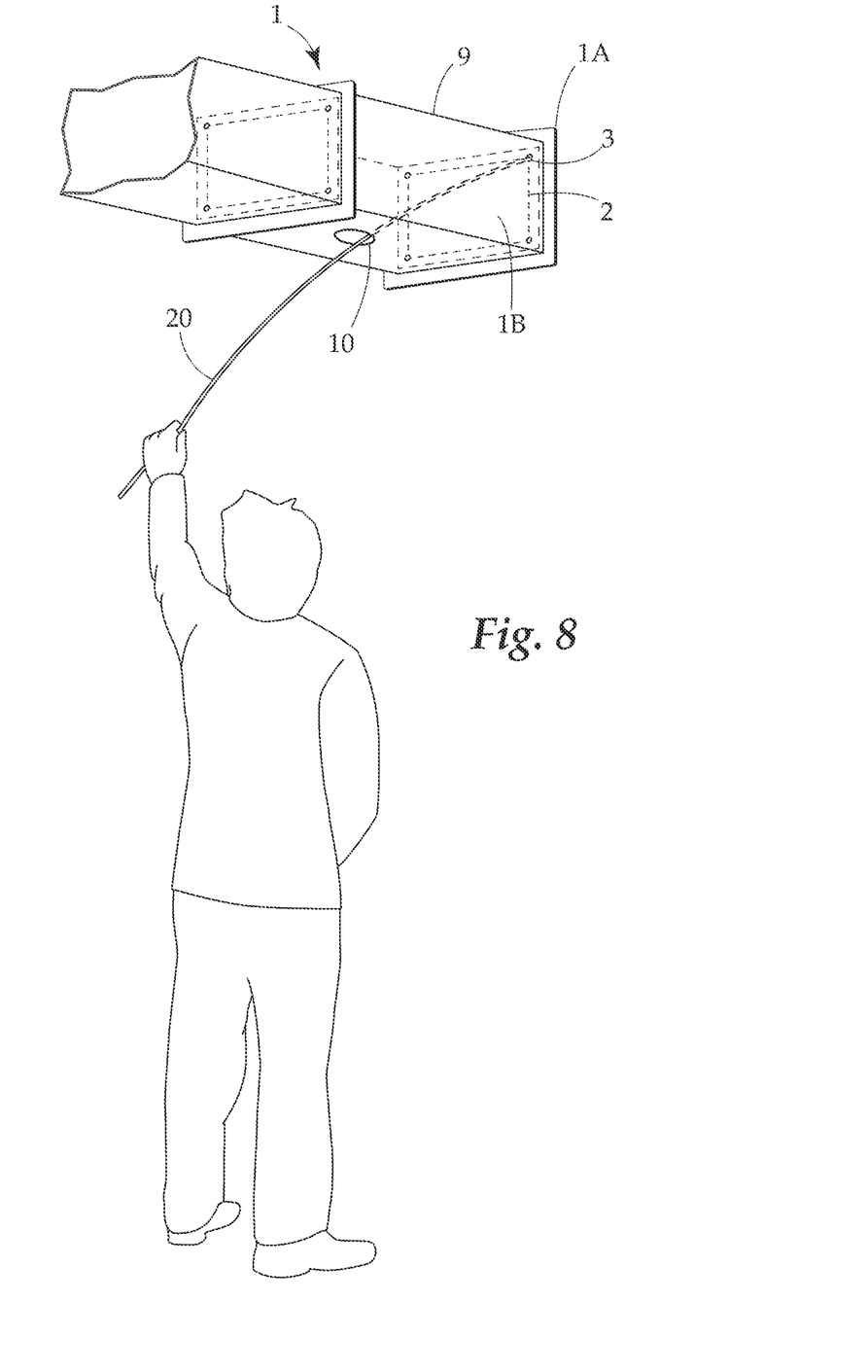
FIG. 8 provides a perspective view of a user utilizing an embodiment of the present disclosure.
Figure 9:
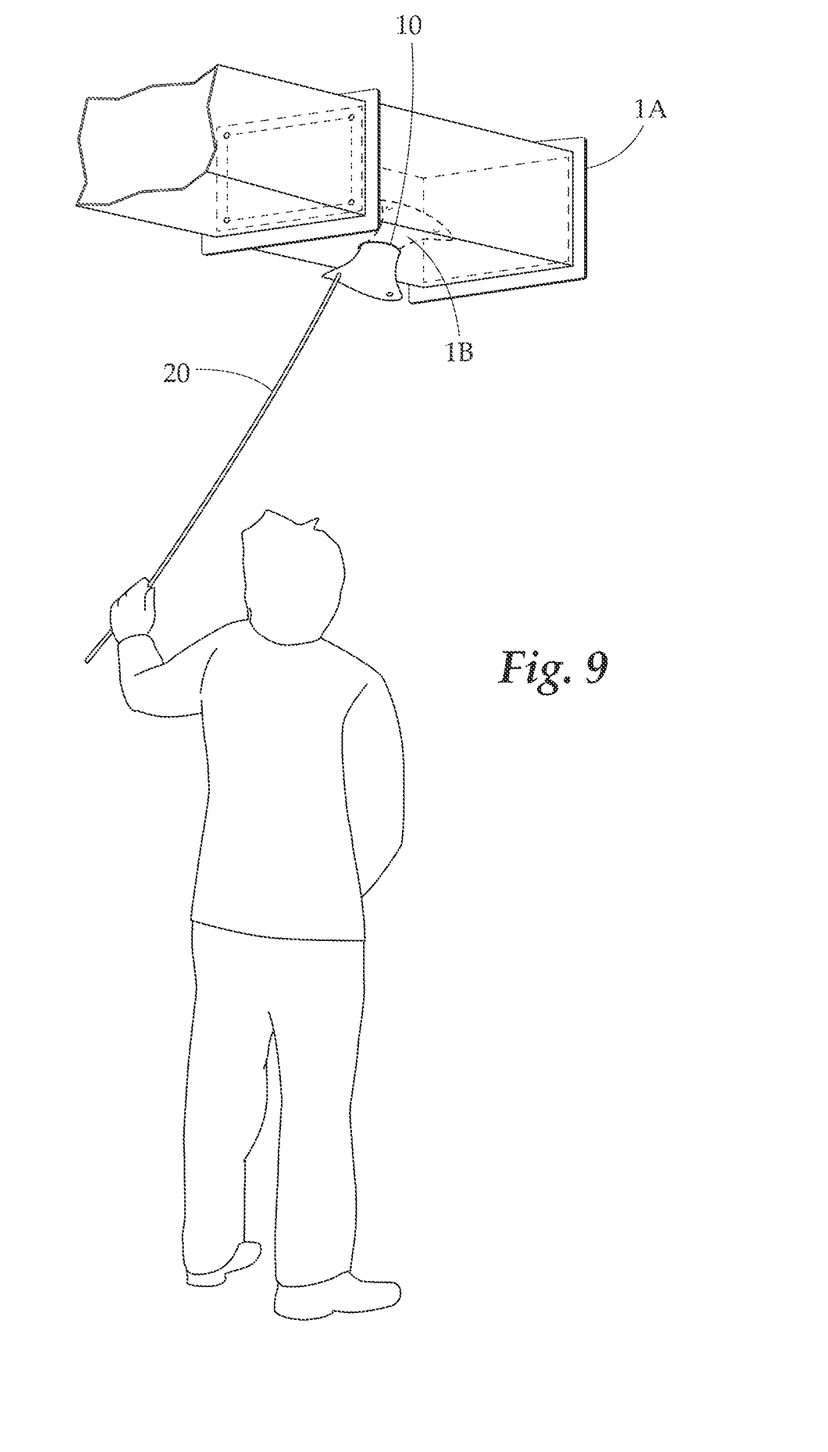
FIG. 9 provides another perspective view of a user utilizing an embodiment of the present disclosure.

FIGS. 8 and 9 show the temporary test barrier 1B being removed from the test duct section 9 around the time that any or all tests are completed. In the embodiment shown, the rip cord 20 is connected to at least one reinforced attachment location 3 and extends through the removal hole 10. The embedded rip cord 2 within the temporary test barrier 1B allows the force from the user's pull to be distributed somewhat evenly across the surface area of the temporary test barrier 1B so as to prevent only a portion of the temporary test barrier 1B from being ripped off from the other portion and pulled through the removal hole 10 without the other portion. This distribution of force allows the user to pull both the rip cord 20 and the temporary test barrier 1B through the removal hole 10, thus separating the temporary test barrier 1B portion from the gasket connection 1A portion of the test barrier 1.

While several variations of the present disclosure have been illustrated by way of example in preferred or particular embodiments, it is apparent that further embodiments could be developed within the spirit and scope of the present disclosure, or the inventive concept thereof. However, it is to be expressly understood that such modifications and adaptations are within the spirit and scope of the present disclosure, and are inclusive, but not limited to the following appended claims as set forth below.

What is claimed is:

1. A test barrier comprising:
   two faces, the two faces comprising a first face and a second face;
   the two faces comprising a temporary test barrier portion defining a first perimeter, a gasket connection portion defining a second perimeter;
   wherein the second perimeter is wider than the first perimeter, and the temporary test barrier portion is connected to the gasket connection portion so that the temporary test barrier portion is contained within the second perimeter;
   the first face comprising at least one attachment location for attaching a rip cord; and
   an embedded rip cord within at least one of the temporary test barrier portion or the gasket connection portion, the embedded rip cord comprising one continuous strand of material that encompasses at least one of the first perimeter or the second perimeter;
   wherein the embedded rip cord is located entirely between the first face and the second face of the test barrier.

2. The test barrier of claim 1 wherein the embedded rip cord is within the temporary test barrier portion of the test barrier.

3. The test barrier of claim 1 further comprising a plurality of attachment locations and an embedded rip cord within the temporary test barrier portion of the test barrier.

4. The test barrier of claim 1, wherein the at least one attachment location comprises at least one ring for attaching the rip cord.

5. A method of using a test barrier, the test barrier comprising:
   two faces, the two faces comprising a first face and a second face;
   the two faces comprising a temporary test barrier portion defining a first perimeter, a gasket connection portion defining a second perimeter;
   wherein the second perimeter is wider than the first perimeter, and the temporary test barrier portion is connected to the gasket connection portion so that the temporary test barrier portion is contained within the second perimeter;

the first face comprising at least one attachment location for attaching a rip cord; and an embedded rip cord within at least one of the temporary test barrier portion or the gasket connection portion;

wherein the embedded rip cord is located between the first face and the second face of the test barrier;

wherein the method comprises the steps of:

applying a test gasket to the gasket connection portion of the test barrier;

attaching the test gasket to a test duct section having a plurality of interior faces and a plurality of exterior faces;

applying a non-test gasket to a gasket connection portion of a second test barrier;

attaching the non-test gasket to a non-test duct section; and conducting a pressure test within the test duct section.

6. The method of claim 5 wherein the non-test duct section further comprises a plurality of interior faces and a plurality of exterior faces.

7. The method of claim 6, wherein the non-test gasket is attached to a flange connection of the non-test duct section and the test gasket is attached to a flange connection of the test duct section.

8. The method of claim 6 further comprising the step of attaching at least one sign to one of the exterior faces of at least one of the test duct section or the non-test duct section.

9. The method of claim 6 further comprising the step of attaching a first portion of the rip cord to the at least one attachment location.

10. The method of claim 9, wherein at least one of the test duct section or the non-test duct section comprises at least one rip cord fastener attached to one of the plurality of interior faces of the duct section, further comprising the step of attaching a second portion of the rip cord to the at least one rip cord fastener.

11. The method of claim 9 further comprising the step of creating at least one removal location on at least one of the test duct section or the non-test duct section.

12. The method of claim 11, wherein the at least one removal location comprises a removal hole.

13. The method of claim 11 further comprising the step of covering the at least one removal location with a snap cap.

14. The method of claim 11, wherein a second portion of the rip cord extends through the removal location, further comprising the step of pulling the rip cord and the temporary test barrier through the removal location.

15. The method of claim 11 further comprising the steps of covering the at least one removal location with a grommet; and extending a second portion of the rip cord through the grommet.

16. The method of claim 15, wherein at least one of the test duct section or the non-test duct section comprises at least one rip cord fastener on one of the plurality of exterior faces of the duct section, further comprising the step of attaching the second portion of the rip cord to the at least one rip cord fastener.

17. A system incorporating the test barrier of claim 1 comprising a test duct section forming a duct connection with a non-test duct section, wherein the duct connection comprises the test barrier, wherein the at least one attachment location of the test barrier is attached to a first portion of the rip cord.

18. The system of claim 17 wherein a second portion of the rip cord is attached to a rip cord fastener, the rip cord fastener comprising hook and loop material.

19. The system of claim 18 further comprising a removal hole and the rip cord fastener attached to an exterior face of the test duct section or the non-test duct section, wherein the second portion of the rip cord extends through a grommet covering the removal hole and attaches to the rip cord fastener.

20. The method of claim 9 wherein the test duct section comprises a removal hole, and the method further comprises the step of removing the test barrier from the test duct section by pulling the rip cord through the removal hole after the pressure test is conducted.

* * * * *